(12) United States Patent
Loaiza et al.

(10) Patent No.: US 6,928,607 B2
(45) Date of Patent: Aug. 9, 2005

(54) DATA INTEGRITY VERIFICATION MECHANISM

(75) Inventors: Juan R. Loaiza, Redwood City, CA (US); Wei-Ming Hu, Palo Alto, CA (US); Jingling William Lee, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 562 days.

(21) Appl. No.: 09/765,680

(22) Filed: Jan. 18, 2001

(65) Prior Publication Data

US 2002/0049950 A1 Apr. 25, 2002

Related U.S. Application Data

(60) Provisional application No. 60/241,959, filed on Oct. 19, 2000.

(51) Int. Cl.[7] .......................... G06F 11/00; H03M 13/00
(52) U.S. Cl. ........................................ 714/807; 714/758
(58) Field of Search ................................. 714/718, 719, 714/807, 808, 824, 758, 768

(56) References Cited

U.S. PATENT DOCUMENTS

| | | | |
|---|---|---|---|
| 5,146,571 A | | 9/1992 | Logan |
| 5,182,752 A | * | 1/1993 | DeRoo et al. .............. 714/758 |
| 5,233,618 A | | 8/1993 | Glider et al. |
| 5,588,012 A | | 12/1996 | Oizumi |
| 5,696,775 A | | 12/1997 | Nemazie et al. |
| 5,805,799 A | | 9/1998 | Fredrickson et al. |
| 6,009,542 A | | 12/1999 | Koller et al. |
| 6,098,190 A | | 8/2000 | Rust et al. |
| 6,324,661 B1 | * | 11/2001 | Gerbault et al. ............ 714/718 |
| 6,438,724 B1 | * | 8/2002 | Cox et al. .................... 714/758 |
| 6,446,234 B1 | * | 9/2002 | Cox et al. .................... 714/758 |
| 2003/0140288 A1 | | 7/2003 | Loaiza et al. |

FOREIGN PATENT DOCUMENTS

EP     0 503 417 A2     9/1992

OTHER PUBLICATIONS

Antoni Cau, et al., "Specifying Fault Tolerance within Stark's Formalism," 1993, IEEE, pp. 392–401.

IBM Corp., "IBM OS/2 Extended Edition Configuration," Feb. 1990, IBM Technical Disclosure Bulletin, vol. 32, No. 9B, pp. 446–451.

Written Opinion from PCT for foreign patent application No. PCT/US03/09063, dated May 24, 2004 (11 pgs.)—attached.

Current Claims in PCT patent application No. PCT/US03/09063 (10 pgs.)—attached.

International Searching Authority, "Notification of Transmittal of the International Search Report or the Declaration," Jun. 10, 2004, 9 pages.

Current claims in PCT patent application, International Application No. PCT/US01/49760, 13 pages.

* cited by examiner

*Primary Examiner*—Albert Decady
*Assistant Examiner*—Cynthia Britt
(74) *Attorney, Agent, or Firm*—Hickman Palermo Truong & Becker, LLP; Edward A. Becker (57) ABSTRACT

A method and apparatus is provided for maintaining data integrity. According to the method, a physical checksum calculation is performed on a block of data. After performing the physical checksum calculation, a logical check is performed on the data contained with the block of data. If the block of data passes the logical check, then the block of data may be written to nonvolatile memory. Thereafter, when the block of data is read from nonvolatile memory a physical checksum verification procedure is performed on the block of data to determine whether the block of data was corrupted after performing the logical check on the data contained with the block of data.

36 Claims, 9 Drawing Sheets

DATA INTEGRITY VERIFICATION MECHANISM

CLAIM OF PRIORITY

This application claims priority to U.S. Provisional Patent Application No. 60/241,959 filed Oct. 19, 2000 and entitled "Data Integrity Verification Mechanism," the contents of which is hereby incorporated by reference in its entirety.

FIELD OF THE INVENTION

The present invention relates generally to data integrity in computer applications, and more specifically, to a data integrity verification mechanism.

BACKGROUND OF THE INVENTION

Society has become extremely dependent upon computers. In today's world, computers are used for everything from financial planning, to company payroll systems, to aircraft guidance systems. Because of the wide spread use of computers systems, data corruption is a problem that can affect almost any individual and an issue that continues to plague both the computer hardware and computer software industries.

For example, software applications, such as database applications, are extremely dependent upon maintaining the integrity of their data. If the data associated with a database application is corrupted, users may experience incorrect results and possibly system crashes.

Data corruption may result for a variety of reasons and from a variety of different sources. For example, a software "bug" in a database application may itself cause invalid data, such as a negative social security number or invalid pointer address, to be stored in a table or data structure. In addition, other programs executing on the same computer system, including the operating system itself, may inadvertently over-write certain variables, tables, data structures, or other similar types of information, thus corrupting the data that is associated with a particular software application. Still further, when an application writes a block of data to disk, the data typically travels through many intermediate layers of software and hardware before it is actually stored to disk. Hence, there is even a further potential for the data block to become corrupted prior to, or at the time it is being written to disk.

For example, when writing a data block to disk, the data may travel from the software application to a volume manager, from the volume manager to a device driver, from the device driver to a disk controller, and from the disk controller to a disk array before being stored onto disk. When the data block is later read from the disk, the data must again travel through the same set of software and hardware layers before it can be used by the software application. Thus, a bug at any of these layers may potentially corrupt the data. Additionally, if the disk is unstable, thus causing errors to be introduced into the data after it is written to disk, the integrity of the data may be compromised even if the other layers do not erroneously alter the data.

Conventionally, data locking schemes provide one method for maintaining the integrity of data that is associated with a particular application. By locking the data so as to deny access by other applications, the operating system can generally warrant that data associated with one application is not over-written or corrupted by another application.

However, conventional locking schemes do not protect against such problems as media failures or bugs in disk drivers or other low level firmware. Moreover, the operating system may itself contain bugs that erroneously cause data to be overwritten and/or corrupted. Thus, conventional locking schemes cannot consistently ensure that the integrity of the data will always be maintained or that corrupted data is never stored to disk.

One method for identifying corrupted data that has been stored on disk is through the use of logical checks and physical checksums. A logical check is a mechanism whereby the integrity of the data is determined by comparing the data to certain predetermined characteristics that are expected to be associated with the data values. For example, if a column in table A includes a set of pointers that are to index a specific row of table B, if any of the pointers has an address value that is not associated with a row of table B, that pointer may be identified as having a corrupted address value. Similarly, if a particular column in a table is configured for storing employee telephone numbers, if the value in any row for that column is determined to be negative, that value can be identified as corrupted.

Figure 1:
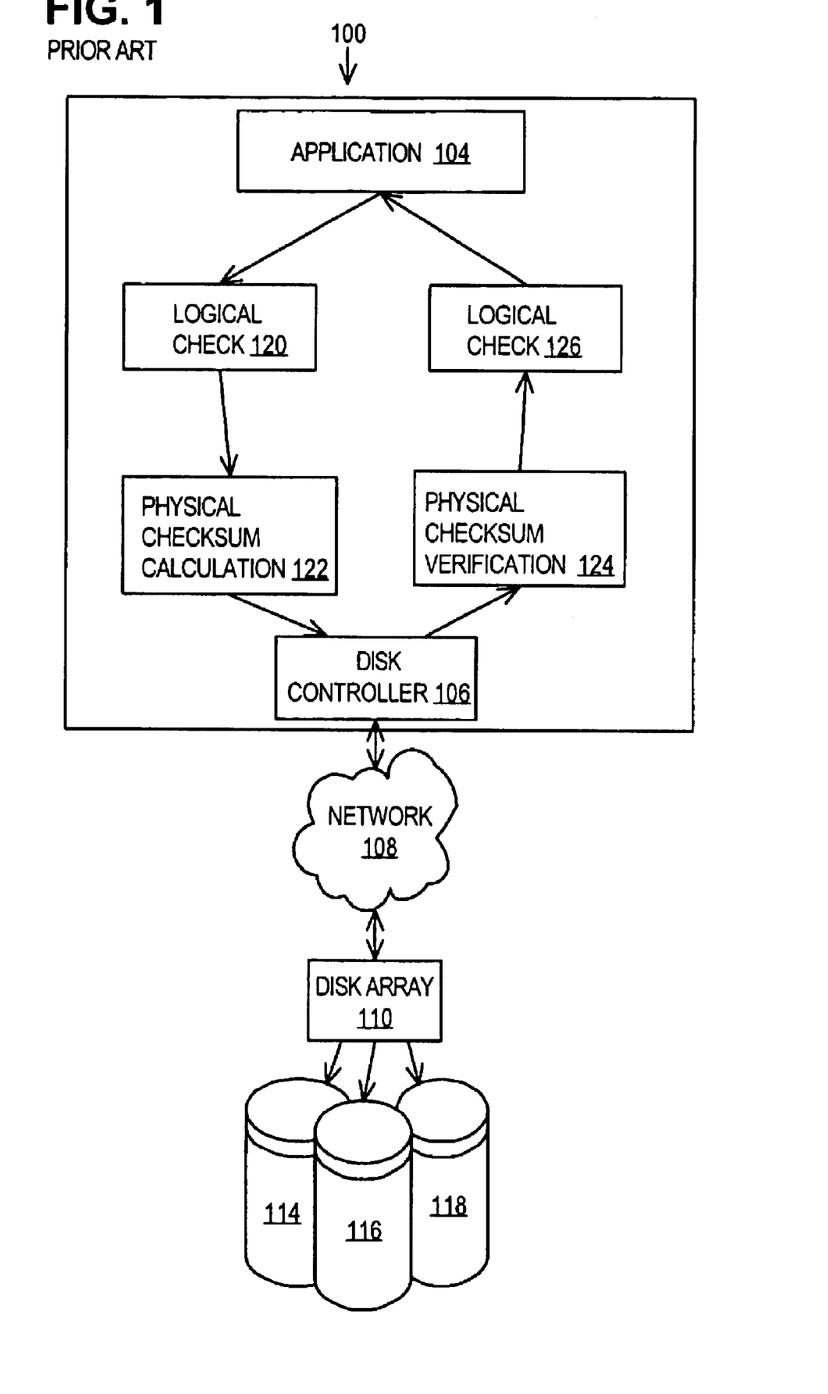
FIG. 1 is a block diagram that illustrates a conventional method for determining the integrity of data that is retrieved from disk by an application.

FIG. 1 illustrates one method for determining the integrity of data that is retrieved from disk by an application, in this example, a user has interacted with application 104 to generate and/or update a block of data that is associated with application 104. For example, the block of data may include updated information for certain tables of a database. To store the data block to disk, a logical check 120 is first performed on the data to verify its integrity. Next, a physical checksum calculation 122 is preformed to calculate and store a checksum value within the data block. The physical checksum calculation 122 provides a mechanism whereby subsequent changes to the bit pattern of the data block may be identified when the data is read back from disk. For example, a checksum value may be calculated and stored within the data block so that when a logical operation, such as an exclusive-or (XOR) operation, is applied to the bits within the data block, a checksum constant such as zero is calculated. Thereafter, the data block is sent to disk controller 106 and then from disk controller 106 to disk array 110, possibly via a network 108, for storage on one or disks 114–118.

Afterwards, if application 104 again requires the updated information contained in the data block, the data block must again travel through several layers (i.e., from the one or disks 114–118 to disk array 110 and from disk array 110 to disk controller 106 over network 108) before it can be used by application 104. To determine the integrity of the data block, a physical checksum verification process is performed to verify that the data block still has the correct checksum constant value. If it is determined that the data block still has the correct checksum constant value, then a logical check 126 is performed on the data to verify that that data block was not corrupted between the time when logical check 120 was performed and the time when physical checksum calculation 122 was preformed.

However, a drawback with the described method for verifying the integrity of a data block is that performing a logical check on the information within the data block requires a significant amount of time and resources (overhead). For many applications that require a large number of data blocks to be continually written and read from disk, for example database applications, the additional overhead can dramatically affect the efficiency and response time of the application.

In addition, another drawback with the described method is that it allows for corrupted data to be written to disk. For example, if the data is corrupted after the logical check 120 is performed, the data will still be written to disk after physical checksum calculation 122 is performed. However, for many applications, specifically non-transaction based applications, the writing of corrupted data to disk can have a catastrophic effect as the invalid changes cannot be easily backed-out.

Based on the foregoing, there is a need for a mechanism for reducing the overhead that is typically associated with storing and retrieving data from disk.

There is also a need for a mechanism that reduces the likelihood that corrupted data is written to disk.

In addition, there is also a need for mechanism that increases the likelihood that data is written to the correct area on disk.

SUMMARY OF THE INVENTION

According to one aspect of the invention, techniques are provided for maintaining data integrity. According to one technique, a physical checksum calculation is performed on a block of data. After performing the physical checksum calculation, a logical check is performed on the data contained with the block of data. If the block of data passes the logical check, then the block of data may be written to nonvolatile memory.

According to one feature, when the block of data is written to or read from nonvolatile memory a physical checksum verification procedure is performed on the block of data to determine whether the block of data was corrupted after performing the logical check on the data contained with the block of data. The physical checksum verification procedure may be performed in a storage device or another location, depending upon the requirements of a particular application.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A data validation mechanism is provided for validating the integrity of data that is associated with an application. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

A data validation mechanism is provided for validating the integrity of data that is associated with an application. In one embodiment, prior to writing a block of data to disk, a physical checksum calculation process is performed on the data block. The physical checksum calculation process provides a mechanism whereby a subsequent physical checksum verification process can be performed to determine whether the data block has been subsequently altered. For example, the physical checksum calculation process may include performing a logical operation on the data within the data block to determine a checksum value and inserting the checksum value into the data block, thus associating a constant checksum value with the data block. The physical checksum verification process, on the other hand, may include subsequently performing the logical operation on the data block and comparing the results with the previously calculated checksum to verify that the data block still has the correct constant checksum value.

After the physical checksum calculation process is performed and prior to storing the data block to disk, a logical check is performed on the data within the data block to verify that certain predetermined characteristics are associated with the data values. If and only if the logical check indicates that certain predetermined characteristics are associated with the data, then the data block is allowed to be written to disk. Thereafter, because the physical checksum calculation process was performed prior to the logical check, when the data block is again required by the application, only a physical checksum verification process is required to verify the integrity of the data block.

Figure 2:
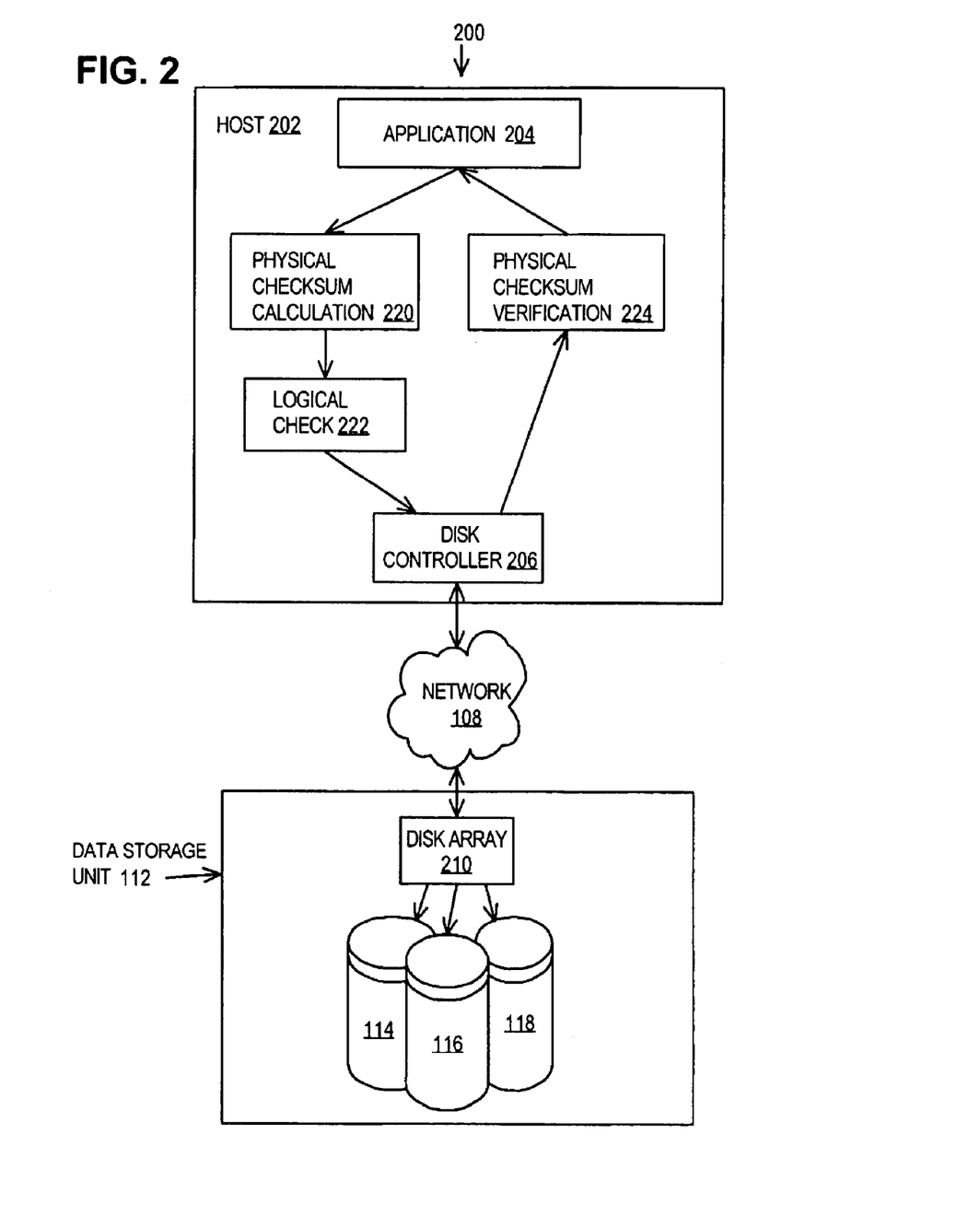
FIG. 2 illustrates a block diagram of a data integrity validation mechanism in which the present invention may be utilized.

FIG. 2 illustrates a block diagram of a data validation mechanism 200 in which the present invention may be utilized. In general, data validation mechanism 200 includes a host computer 202, a network 108 and a data storage unit 112.

Network 108 is a network system that provides a communication medium for communicating between host 202 and data storage unit 112. Network 108 may represent a variety of different forms of communication mediums which includes but is not limited to a serial or parallel medium connection, a local area network (LAN), a wide area network (WAN), the global packet-switched network known as the Internet, a wireless transmission medium, or any other medium for exchanging information between the participants. Network 108 represents a direct cable connection to Disk Array 210 that utilizes a communication protocol such as SCSI or fiber channel, or a combination of different network mediums, for example a combination of LANs and wireless communication networks that are configured to allow Disk Controller 206 and Disk Array 210 to communicate.

Data storage unit 112 represents one or more nonvolatile memory components that are used for storing data for application 204. Data storage unit 112 is not limited to any particular type of storage medium. In particular, as used herein, the term nonvolatile memory is broadly defined as any type of persistent storage or persistent media that can be used for persistently storing information. In this example, data storage unit 112 represents a Redundant Array of Independent Disks or Drives (RAID) that includes a disk array unit 210 and one or more disks 114–118.

Host computer 202 is a computer, or a group of hardware or software components or processes that cooperate or execute in one or more computer systems. In this example, host computer 202 includes an application 204, a physical checksum calculation process 220, a logical check process 222, a physical checksum verification process 224 and a disk controller 206.

Application 204 may represent a variety of different software applications that are configured to manipulate data and to store and retrieve data from data storage unit 112. For example, application 204 may represent various applications that include but are not limited to database applications, word processing applications, CAD design applications or financial planning applications. Physical checksum calculation process 220, logical check process 222, and physical checksum verification process 224 may represent embedded code within application 204 or may be separate processes, tasks or programs, that may be statically or dynamically linked to application 204.

In one embodiment, prior to causing a block of data to be written to data storage unit 112, application 204 initiates a physical checksum calculation process 220 to generate a checksum value for inserting into the data block. In one embodiment, to generate the checksum value, a logical operation, such as an XOR or ADD operation is performed on the data that is contained in the data block. Based on the vector that results from performing the logical operation, and a desired checksum constant, a checksum value is selected and inserted into the data block. Thereafter, the integrity of the data block can be determined by performing the same logical operation on the data block and comparing the results with the checksum value stored with the data block.

After the physical checksum calculation process 220 is performed, logical check 222 is performed on the data within the data block to verify that certain predetermined characteristics are associated with the data values. If the logical check indicates that certain predetermined characteristics are not associated with the data, a recovery sequence may be performed to correct and/or remove the incorrect or corrupted data within the data block.

Alternatively, if the logical check indicates that certain predetermined characteristics are associated with the data, the data block is then forwarded to disk controller 206. Disk controller 206 then communicates with disk array unit 210 via network 108 to cause the data block to be stored on one or more disks 114–118.

Thereafter, when the data block is again required by application 204, the data block is retrieved from data storage unit 112 and forwarded to disk controller 206. A physical checksum verification process 224 is then performed on the data block to verify that the data has not been corrupted since the physical checksum calculation process 220 was performed. In one embodiment, to execute the physical checksum verification process 224, the logical operation used by physical checksum calculation process 220 is performed on the data block. The results of the logical operation are then compared with the checksum stored with the data block to determine whether the integrity of the data block has been maintained since the physical checksum calculation process 220 was performed. Advantageously, because the physical checksum calculation 220 was performed prior to logical check 222, an additional logical check is not required to verify the integrity of the data block. Thus, the data retrieval overhead that is typically required in conventional systems can be significantly reduced.

Multi-level Data Verification

Figure 3A:
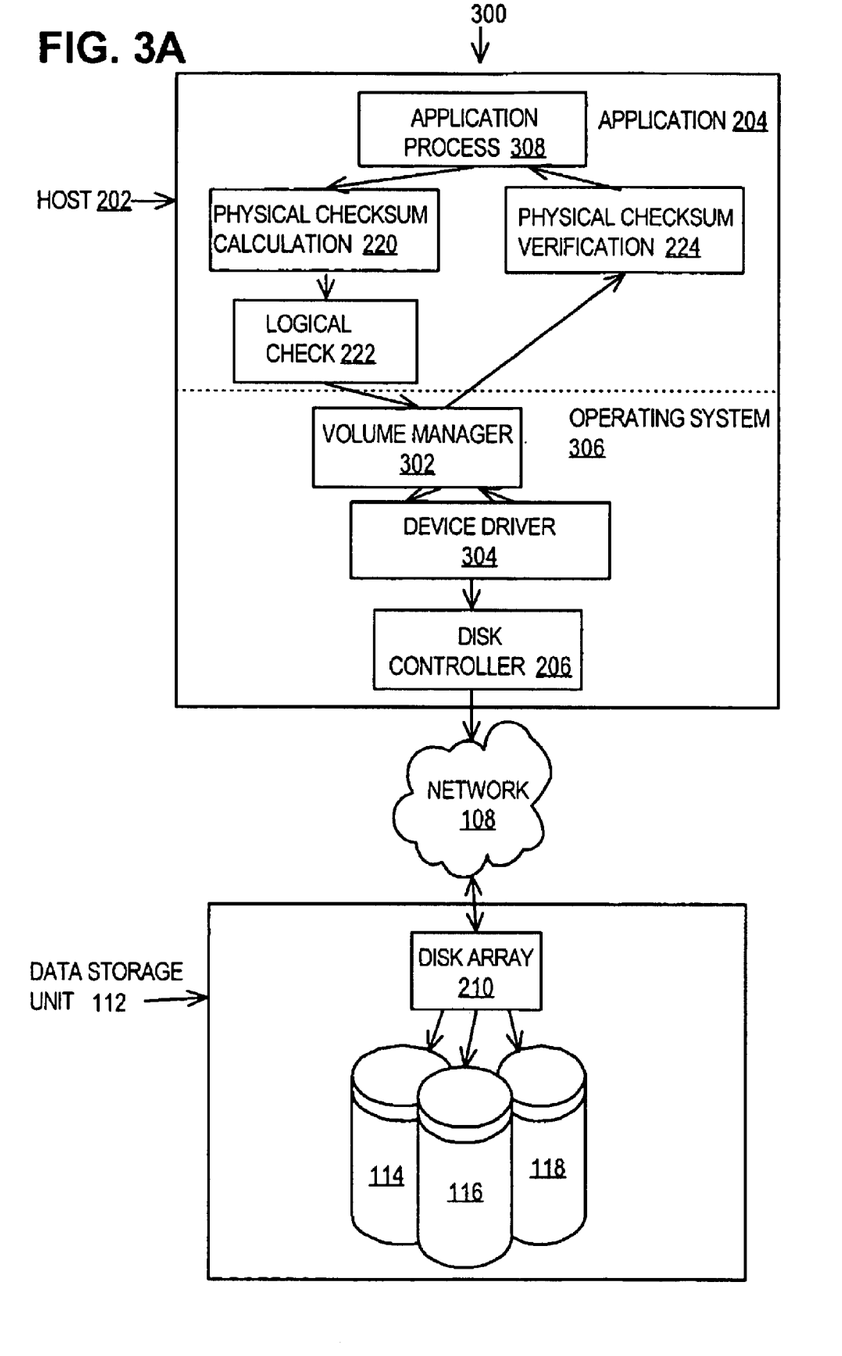
FIG. 3A illustrates a block diagram of a multi-level data verification system in which the present invention may be utilized.

In certain embodiments, the integrity of a data block is verified at multiple levels before being stored to disk. FIG. 3A illustrates an example of a multi-level data verification system whereby the integrity of a data block is verified at multiple levels prior to being stored to disk. FIG. 3A is similar to FIG. 2 and therefore like components have been numbered alike.

In this example, an operating system 306 includes a volume manager 302 and a device driver 304. The volume manager 302 is configured to interface with application programs, such as application 204, and to manage the storing and retrieving of data to and from nonvolatile memory (disks 114–118). Device driver 304 provides an interface for communicating between operating system 306 and disk controller 206. In one embodiment, volume manager 302 and/or device driver 304 are configured to execute a physical checksum verification process to verify that a data block has not been corrupted since performing physical checksum calculation process 220 (for example, physical checksum verification procedure 224). By performing a physical checksum verification process at different processing levels between application process 308 and the disks 114–118, the integrity of the data can be further verified before it is actually written to disk. In addition, the described multi-level verification scheme can help identify where the data became corrupted as the multi-level verification tests help to isolate where the data was corrupted. Furthermore, in certain embodiments, the multi-level verification scheme is configured to detect corrupted data before it is written to disk and to give the application, or other process, the ability to correct the corrupted data before it is written to disk. For example, if data that has been identified as corrupted is allowed to be written to disk, the next time the application reads the corrupted data from disk, which may be many days, months or even years latter, the application may not have the information and/or the ability to correct the corrupted data. However, by not allowing data to be written to disk that has been identified as corrupted, a verification scheme is provided that reduces the chance that the application will read corrupted data from disk.

In certain embodiments, the multi-level data verification system may include the performance of data integrity checks at other components that are along the path between application 204 and disks 114–118. For example, in one embodiment, disk controller 206 and disk array 210 may be configured to perform data integrity checks on data associated with application 204. For example, in certain embodiments, disk controller 206 is configured to execute a physical checksum verification process to verify that a data block has not been corrupted since performing physical checksum calculation process 220. By performing a physical checksum verification process at disk controller 206, the verification system can verify that components other than application 204, for example operating system 306, have not corrupted the integrity of the data. In addition, by configuring disk array 210 to execute a physical checksum verification process, the verification system can verify that the data was not corrupted by any other component, including network 108. Moreover, by configuring disk array 210 to execute a physical checksum verification process, the verification system can significantly reduce the chance that corrupted data will be stored on disks 114–118.

Figure 3B:
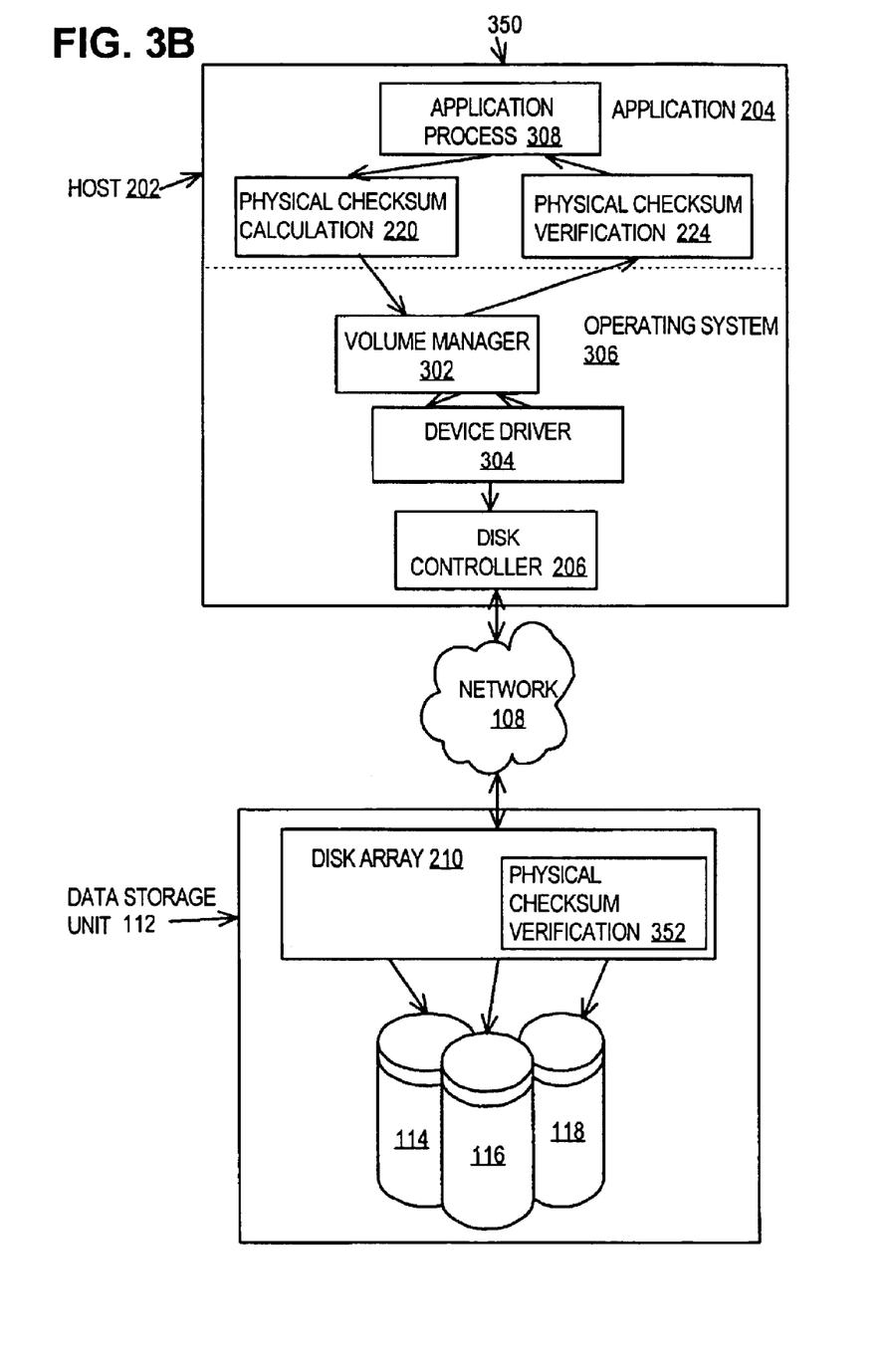
FIG. 3B illustrates a block diagram of another data verification system in which the present invention may be utilized.

For example, FIG. 3B illustrates an example of a multi-level data verification system 350 whereby the integrity of a data block is verified by performing a physical checksum verification procedure prior to storing a data block to disk. FIG. 3B is similar to FIG. 3A and therefore like components have been numbered alike. In this example, after application 204 performs the physical checksum calculation 220, the block of data is forwarded to disk controller 206 without performing a logical check on the data within the data block. Disk controller 206 then forwards the data block via network 108 to disk array 210 for storage within data storage unit 112. In this example, upon receiving the data block, disk array 210 performs a physical checksum verification process 352 to verify that the data has not been corrupted since the physical checksum calculation 220 was performed by application 204. If it is determined that the data block has not been corrupted then the data block is written to disk. Alternatively, if it determined that the data block has been corrupted then an error flag is set and the data block is not written to disk. By performing a physical checksum verification process at disk array 210, the verification system 350 can verify the integrity of the data immediately prior to storing the data block to disk. In particular, the verification system 350 can verify that components other than application 204, for example operating system 306 or disk controller 206 did not corrupt the data prior to storing the data block to disk.

In addition, as previously described for FIG. 3A, additional data integrity checks may be performed at other components that are along the path between application 204 and disks 114–118. For example, volume manager 302, device driver 304 and disk controller 206 may also be configured to perform data integrity checks on data blocks that are to be stored to disk. Furthermore, application 204 may optionally perform physical checksum verification 224 when the data block is subsequently retrieved from disk.

Verification Sequence for Writing Data to Nonvolatile Memory

Figure 4A:
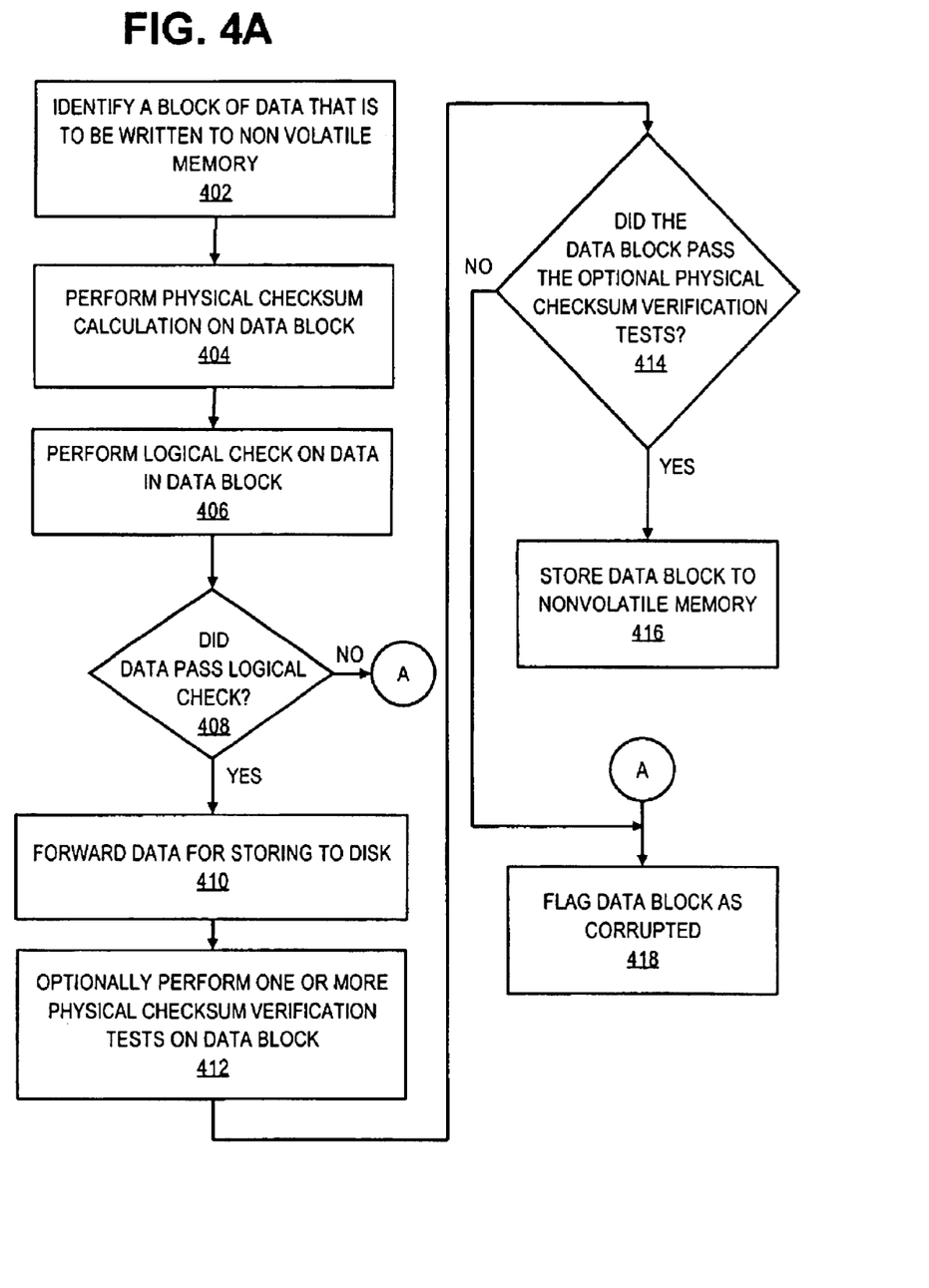
FIG. 4A is a flow diagram that illustrates an example of a multi-level verification sequence for verifying the integrity of data that is to be written to nonvolatile memory.

FIG. 4A is a flow diagram that illustrates an example of a multi-level verification sequence for verifying the integrity of data that is to be written to nonvolatile memory in accordance with certain embodiments of the invention. For explanation purposes, FIG. 4A will be described in reference to FIG. 3A.

At block 402 a block of data that is to be written to nonvolatile memory is identified. For example, a block of data that has been updated by application 204 may be required to be written to one or more disks 114–118.

At block 404, a physical checksum calculation process is performed on the block of data. For example, physical checksum calculation process 220 may be initiated to determine a checksum value for inserting into the data block.

At block 406, a logical check is optionally performed on the data within the data block. For example, a logical check may be performed on the data to verify that certain predetermined characteristics are associated with the data values.

At block 408, assuming that the logical check was performed, a decision is made as to whether the data within the data block passed the logical check. If the data passes the logical check then the process proceeds to block 410. Alternatively, if the data did not pass the logical check, then the process proceeds to block 418.

At block 410, the data is forwarded for storing in nonvolatile memory. For example, the data block may be forwarded to operating system 306 for storage on the one or more disks 114–116.

At block 412, one or more components may optionally perform a physical checksum verification procedure to verify the integrity of the data with the data block. For example, components such as the volume manager 302, device driver 304, disk controller 206 and disk array 210 may be configured to perform a physical checksum verification procedure to verify the integrity of the data based on the checksum value.

If an optional physical checksum verification procedure is performed by one or more components, then at block 414, for each checksum verification procedure performed, a decision is made as to whether the data within the data block passed the physical checksum verification test. If the data passes the optional physical checksum verification tests, then at block 416, the data block is written to nonvolatile memory. Alternatively, if the data did not pass one or more of the optional physical checksum verification tests, then at block 418 the data block is flagged as containing corrupted data and thus not written to disk.

Verification Sequence for Retrieving Data from Nonvolatile Memory

Figure 4B:
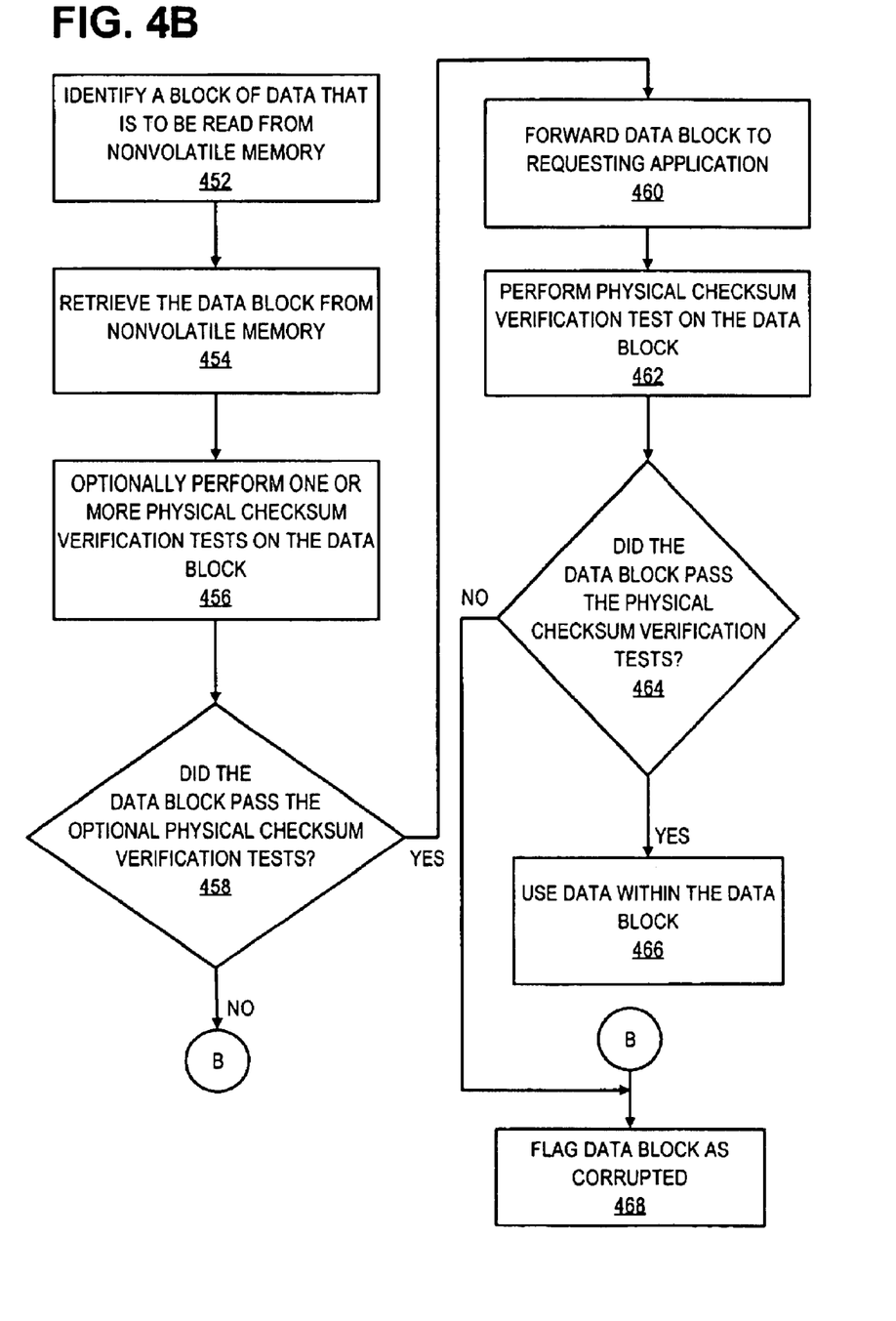
FIG. 4B is a flow diagram that illustrates an example of a multi-level verification sequence for verifying the integrity of data that is read from nonvolatile memory.

FIG. 4B is a flow diagram that illustrates an example of a multi-level verification sequence for verifying the integrity of data that is read from nonvolatile memory in accordance with certain embodiments of the invention. For explanation purposes, FIG. 4B is also described in reference to FIG. 3A.

At block 452 a block of data that is stored in nonvolatile memory is identified. For example, a block of data that was previously updated by application 204 may be required to be read from the one or more disks 114–118.

At block 454, the data block is located and retrieved from nonvolatile memory.

At block 456, one or more components may optionally perform a physical checksum verification procedure to verify the integrity of the retrieved data block. For example, components such as disk array 210, disk controller 206, device driver 304, and volume manager 302, may be configured to perform a physical checksum verification procedure to verify the integrity of the retrieved data based on a known checksum constant value.

If one or more components perform an optional physical checksum verification procedure to verify the integrity of the retrieved data, then at block 458, for each checksum verification procedure performed, a decision may be made as to whether the data within the data block passed the physical checksum verification test. If the data did not pass one or more of the optional physical checksum verification tests, then the process proceeds to block 468.

Alternatively, if the data passes the optional physical checksum verification tests, then at block 460, the data block is forwarded to the requesting application.

At block 462, the requesting application performs a physical checksum verification procedure to verify the integrity of the retrieved data block. For example, application 204 may be configured to perform a physical checksum verification procedure 224 to verify the integrity of the retrieved data based on a known checksum constant value.

In certain embodiments, if the retrieved data block has been found to have passed one or more of the optional physical checksum verification tests since being read from nonvolatile memory, the requesting application may optionally skip the physical checksum verification procedure in block 462.

At block 464 a decision is made as to whether the data block passed the checksum verification procedure 224 that was performed by the application. If the data did not pass the physical checksum verification test, then at block 468 the data block is flagged as containing corrupted data.

Alternatively, if the data passes the physical checksum verification procedure 224, then at block 466, the data within the data block may be used by the requesting application.

Block Location Verification

Figure 5:
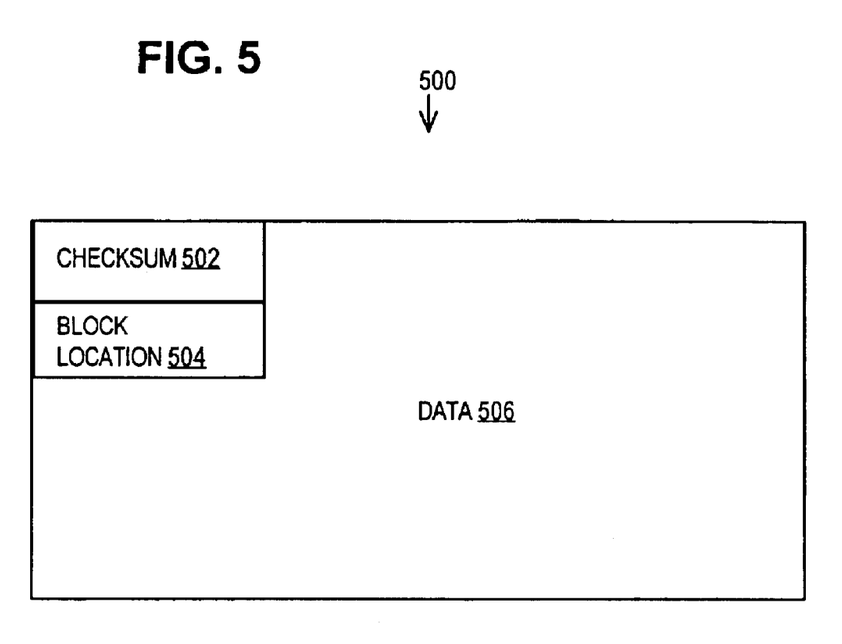
FIG. 5 illustrates a mechanism for verifying the location that a block is to be written to nonvolatile memory.

In certain embodiments, a mechanism is provided for identifying the block location that is to be used for storing a particular data block into nonvolatile memory (the "desired block address"). For example, a desired block address may be stored in each data block to identify the physical address at which the data block is to be stored in nonvolatile memory. FIG. 5 illustrates a mechanism whereby a block location identifier 504 is maintained within a block 500. In one embodiment, the block location identifier 504 represents the physical address of where the data block 500 is to be stored in nonvolatile memory. By storing the block location identifier 504 within block 500, components, such as disk array 210, can verify that the data block is stored in the correct location in nonvolatile memory.

In certain embodiments, application 204, or a component associated with application 204, maintains a mapping of the topology of the one or more disks 114–118. Using the mapping, the physical address at which a block is to be stored can be identified and stored within the block. Upon receiving a data block, disk array 210 verifies that the physical address associated with the block location identifier 504 correctly corresponds to the location at which the block is to be stored in nonvolatile memory. In certain embodiments, an error is flagged if the block location identifier 504 does not correctly correspond to the location at which the block is to be stored, thus causing the block not to be stored to nonvolatile memory. For example, the operating system 306 and/or application 204 may be notified if the block location identifier 504 does not correctly correspond to the location at which the block is to be stored. In one embodiment, the block location identifier 504 is used to verify that the block is read from the correct location in nonvolatile memory. For example, by comparing the block location identifier 504 with the physical location in memory from where the data was retrieved, disk array 210 can verify that the data block was retrieved from the correct location in nonvolatile memory.

In certain embodiments, multiple block locations identifiers may be stored within a block that identify multiple locations for which the block is to stored. For example, to provide for a mirroring database system, multiple block location identifiers may be stored in each data block to identify the multiple locations that the data block is to be stored in nonvolatile memory. Alternatively, a single block location identifier 504 may be included in each block and disk array 210 may be configured to verify the address and to determine one or more other addresses for mirroring the data block in nonvolatile memory.

Verification Sequence in Performing Backups

Figure 6:
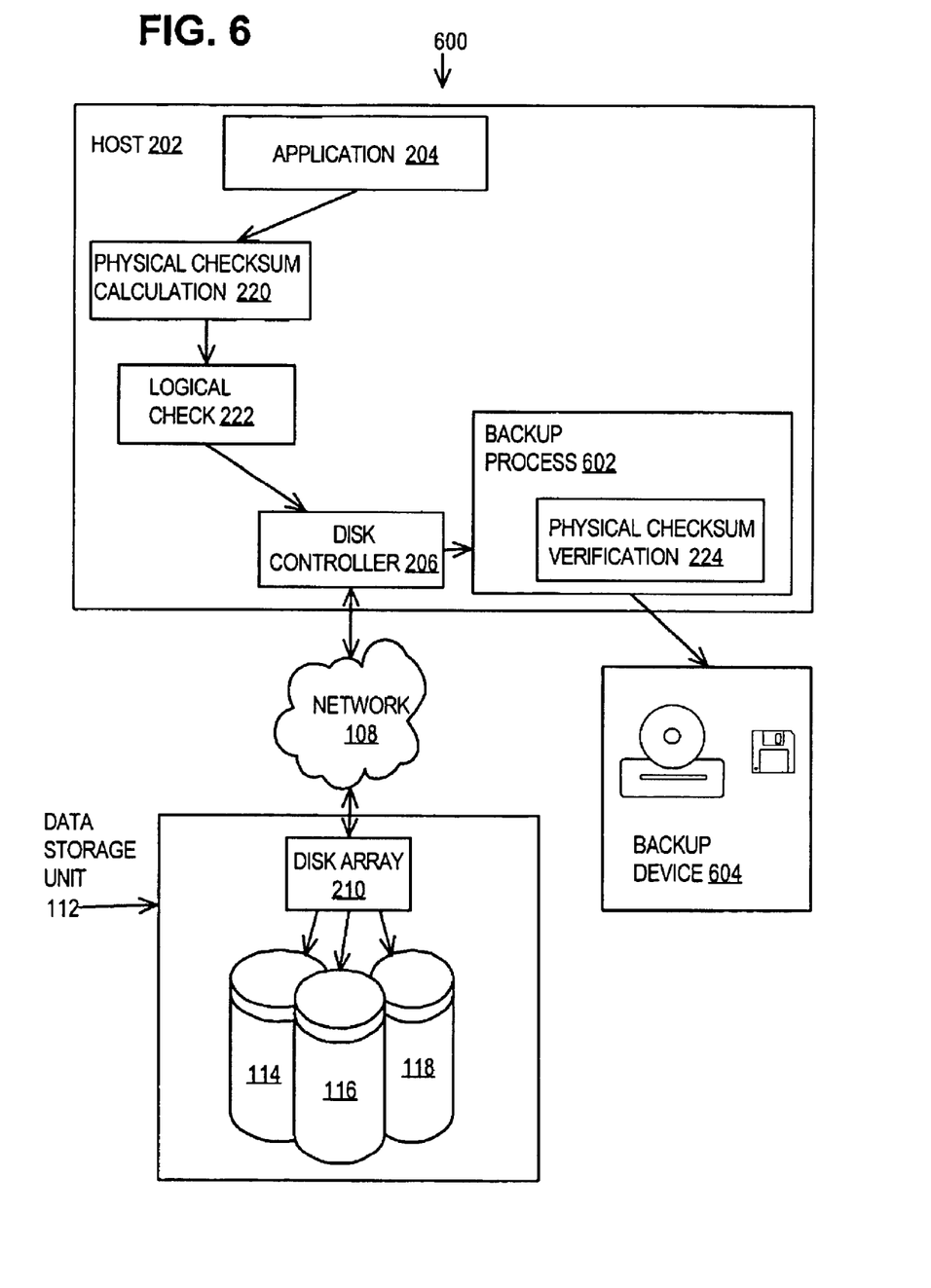
FIG. 6 illustrates a block diagram of a backup system in which the present invention may be utilized.

In certain embodiments, a data validation mechanism is provided for backing-up data that is associated with one or more application programs. FIG. 6 illustrates a backup system 600 in which a backup process 602 performs a physical checksum verification procedure prior to storing a data block to backup unit 604. In this example, backup unit 604 is not limited to any particular type of backup mechanism or medium and thus may include a variety of different types of backup components that may include but is not limited to tape drive units, ZIP drive units, DVD or CD ROM units, and floppy disk units.

In one embodiment, in backing-up one or more blocks of data, backup process 602 retrieves the data blocks from data storage unit 112 and performs a physical checksum verification procedure on each block to verify the integrity of the data. As previously shown above, because the physical checksum calculation 220 was performed prior to logical check 222, an additional logical check is not required to verify the integrity of the data block. Thus, the overhead that is typically required in a conventional backup systems can be significantly reduced. In addition, by performing a physical checksum verification process at backup process 602, a backup verification system is provided that can significantly reduce the chance that corrupted data will be stored on backup device 602.

In certain embodiments, upon determining that the data has been corrupted, the backup process 602 causes the corrupted data not to be written to backup device 604. The backup process 602 may instead communicate with application 204, or other process, to correct the corrupted data before it is allowed to be written to backup device 604. By not allowing the corrupted data to be written to backup device 604, a verification scheme is provided that reduces the chance that the corrupted data will be stored on backup device 604. Additionally, although FIG. 6 depicts logical check 222, in certain embodiments system 600 may not include the performance of logical check 222. For example, in one embodiment, system 600 does not include logical check 222 but instead relies on one or more physical checksum verification processes to perform data integrity checks on the data that is written to and retrieved from data storage unit 112.

Also, in certain embodiments, instead of receiving the data blocks directly from disk controller 206 or other operating system components, the backup process 602 may be configured to communicate with the application 204 to receive the data blocks. Upon receiving a data block, backup process 602 may still be configured to perform physical checksum procedure 224 to ensure that the data is not corrupted before being written to backup unit 604.

Hardware Example

Figure 7:
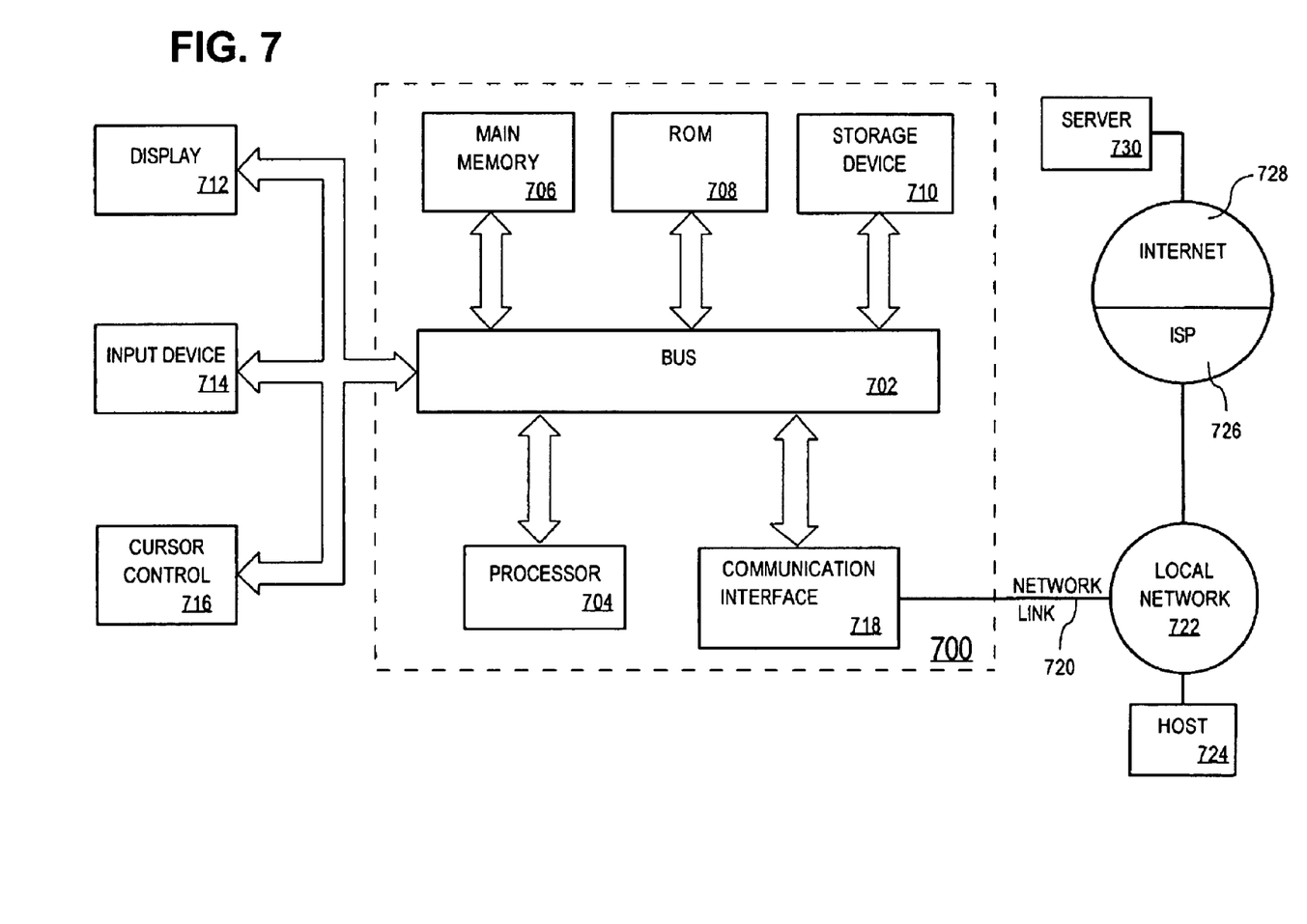
FIG. 7 is a block diagram of a computer system with which an embodiment may be carried out.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing a data integrity verification mechanism. According to one embodiment of the invention, a data integrity verification mechanism is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for data integrity verification as described herein.

The received code may be executed by processor 704 as it is received, and/or stored in storage device 710, or other non-volatile storage for later execution. In this manner, computer system 700 may obtain application code in the form of a carrier wave.

Alternatives, Extensions

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for maintaining data integrity, comprising the computer-implemented steps of:
   generating checksum data by a software application performing a physical checksum calculation on a block of data;
   after generating said checksum data,
      the software application performing a logical check on data contained within the block of data;
      one or more components other than the software application performing one or more physical checksum verification procedures prior to writing the block of data to a nonvolatile memory; and
      if the block of data passes said logical check, then causing the block of data to be written to the nonvolatile memory.

2. The method of claim 1 wherein the steps of generating checksum data and performing a logical check are performed in response to a request to write said block of data to the nonvolatile memory.

3. The method of claim 1 further comprising the step of writing the checksum data to the nonvolatile memory in association with writing said block of data to the nonvolatile memory.

4. The method as recited in claim 3, further comprising the steps of:
   after writing the block of data to the nonvolatile memory,
      causing the block of data and said checksum data to be read from the nonvolatile memory; and
      performing a physical checksum verification procedure on said block of data based on said checksum data, wherein the physical checksum verification procedure indicates whether the block of data was corrupted subsequent to performing the logical check on the data contained with the block of data.

5. A method for maintaining data integrity, comprising the computer-implemented steps of:
   generating checksum data by performing a physical checksum calculation on a block of data;
   after generating the checksum data,
      performing a logical check on data contained within the block of data;
      if the block of data passes the logical check, then
         causing the block of data to be written to nonvolatile memory; and
         writing the checksum data to the nonvolatile memory in association with writing the block of data to the nonvolatile memory; and
   after writing the block of data to the nonvolatile memory,
      causing the block of data and the checksum data to be read from the nonvolatile memory; and
      performing a physical checksum verification procedure on the block of data based on the checksum data, wherein the physical checksum verification procedure indicates whether the block of data was corrupted subsequent to performing the logical check on the data contained with the block of data.

6. A method for maintaining data integrity, comprising the computer-implemented steps of:
   a software application performing a physical checksum calculation on a block of data;
   after performing the physical checksum calculation,
      a component other than the software application performing a first physical checksum verification procedure on said block of data prior to writing the block of data to a nonvolatile memory, wherein the first physical checksum verification procedure indicates whether the block of data was corrupted subsequent to the software application performing the physical checksum calculation on the block of data; and
      if the block of data passes said first physical checksum verification procedure, then causing the block of data to be written to the nonvolatile memory.

7. The method as recited in claim 6, further comprising the steps of:
   after writing the block of data to the nonvolatile memory,
      causing the block of data to be read from the nonvolatile memory; and
      performing a second physical checksum verification procedure on said block of data, wherein the second physical checksum verification procedure indicates whether the block of data was corrupted subsequent to performing the first physical checksum verification procedure on the block of data.

8. The method as recited in claim 6, further comprising performing one or more other physical checksum verification procedures on said block of data prior to writing the block of data to the nonvolatile memory, wherein the one or more other physical checksum verification procedures indicate whether the block of data was corrupted subsequent to performing the physical checksum calculation on the block of data.

9. The method as recited in claim 6, wherein the step of a component other than the software application performing a first physical checksum verification procedure on said block of data comprises the step of a disk array component performing the first physical checksum verification procedure on said block of data, wherein the disk array component is configured to write the block of data to disk only after verifying the integrity of the data block.

10. A computer-readable medium for maintaining data integrity, the computer-readable medium carrying one or more sequences of one or more instructions which, when executed by one or more processors, cause the one or more processors to perform the steps of:
   generating checksum data by a software application performing a physical checksum calculation on a block of data;
   after generating said checksum data,
      the software application performing a logical check on data contained within the block of data;
      one or more components other than the software application performing one or more physical checksum verification procedures prior to writing the block of data to a nonvolatile memory; and
      if the block of data passes said logical check, then causing the block of data to be written to the nonvolatile memory.

11. The computer-readable medium of claim 10 wherein the steps of generating checksum data and performing a logical check are performed in response to a request to write said block of data to the nonvolatile memory.

12. The computer-readable medium of claim 10 further comprising one or more sequences of additional instructions which, when executed by the one or more processors, cause the one or more processors to perform the step of writing the checksum data to the nonvolatile memory m association with writing said block of data to the nonvolatile memory.

13. The computer-readable medium as recited in claim 12, further comprising one or more sequences of additional instructions which, when executed by the one or more processors, cause the one or more processors to perform the steps of:

after writing the block of data the nonvolatile memory,
causing the block of data and said checksum data to be read from the nonvolatile memory; and
performing a physical checksum verification procedure on said block of data based on said checksum data, wherein the physical checksum verification procedure indicates whether the block of data was corrupted subsequent to performing the logical check on the data contained with the block of data.

14. A computer-readable medium for maintaining data integrity, the computer-readable medium carrying instructions which, when processed by one or more processors, cause:

generating checksum data by performing a physical checksum calculation on a block of data;
after generating the checksum data,
performing a logical check on data contained within the block of data;
if the block of data passes the logical check, then
causing the block of data to be written to nonvolatile memory; and
writing the checksum data to the nonvolatile memory in association with writing the block of data to the nonvolatile memory; and
after writing the block of data to the nonvolatile memory,
causing the block of data and the checksum data to be read from the nonvolatile memory; and
performing a physical checksum verification procedure on the block of data based on the checksum data, wherein the physical checksum verification procedure indicates whether the block of data was corrupted subsequent to performing the logical check on the data contained with the block of data.

15. A computer-readable medium for storing data in a nonvolatile memory, the computer-readable medium carrying one or more sequences of one or more instructions which, when executed by one or more processors, cause the one or more processors to perform the steps of:

a software application performing a physical checksum calculation on a block of data;
after performing the physical checksum calculation,
a component other than the software application performing a first physical checksum verification procedure on said block of data prior to writing the block of data to the nonvolatile memory, wherein the first physical checksum verification procedure indicates whether the block of data was corrupted subsequent to the software application performing the physical checksum calculation on the block of data; and
if the block of data passes said first physical checksum verification procedure, then causing the block of data to be written to the nonvolatile memory.

16. The computer-readable medium as recited in claim 15, further comprising one or more sequences of additional instructions which, when executed by the one or more processors, cause the one or more processors to perform the steps of:

after writing the block of data to the nonvolatile memory,
causing the block of data to be read from the nonvolatile memory; and
performing a second physical checksum verification procedure on said block of data, wherein the second physical checksum verification procedure indicates whether the block of data was corrupted subsequent to performing the first physical checksum verification procedure on the block of data.

17. The computer-readable medium as recited in claim 15, further comprising performing one or more other physical checksum verification procedures on said block of data prior to writing the block of data to the nonvolatile memory, wherein the one or more other physical checksum verification procedures indicate whether the block of data was corrupted subsequent to performing the physical checksum calculation on the block of data.

18. The computer-readable medium as recited in claim 15, wherein the step of a component other than the software application performing a first physical checksum verification procedure on said block of data comprises the step of a disk array component performing the first physical checksum verification procedure on said block of data, wherein the disk array component is configured to write the block of data to disk only after verifying the integrity of the data block.

19. A storage device comprising:
a software application configured to perform a physical checksum calculation on a block of data; and
a component configured to
perform a first physical checksum verification procedure on the block of data prior to writing the block of data to a nonvolatile memory, wherein the first physical checksum verification procedure indicates whether the block of data was corrupted subsequent to the software application performing the physical checksum calculation on the block of data, and
if the block of data passes said first physical checksum verification procedure, then cause the block of data to be written to the nonvolatile memory.

20. The storage device as recited in claim 19, wherein the component is further configured to after writing the block of data to the nonvolatile memory, cause the block of data to be read from the nonvolatile memory; and
perform a second physical checksum verification procedure on said block of data, wherein the second physical checksum verification procedure indicates whether the block of data was corrupted subsequent to the component performing the first physical checksum verification procedure on the block of data.

21. The storage device as recited in claim 19, wherein the component is further configured to perform one or more other physical checksum verification procedures on said block of data prior to writing the block of data to the nonvolatile memory, wherein the one or more other physical checksum verification procedures indicate whether the block of data was corrupted subsequent to performing the physical checksum calculation on the block of data.

22. The storage device as recited in claim 19, wherein the component is a disk array.

23. A storage device comprising:
a storage medium;
a software application configured to perform a logical check on data contained in a block of data after the software application has previously performed a physical checksum calculation on the block of data; and one or more components other than the software application configured to perform one or more physical checksum verifications prior to allowing the block of data to be written to the storage medium, wherein the one or more physical checksum verifications indicate whether the block of data was corrupted subsequent to the physical checksum calculation;

wherein the software application is further configured to allow the block of data to be written to the storage medium if the block of data passes the logical check.

24. The apparatus as recited in claim 23, wherein the physical checksum calculation and the logical check are both performed in response to a request to write the block of data to the storage medium.

25. The apparatus as recited in claim 23, wherein the storage device is further configured to write, to the storage medium, checksum data generated by the physical checksum calculation.

26. The apparatus as recited in claim 25, wherein the storage device is further configured to after the block of data is written to the storage medium, cause the block of data and the checksum data to be read from the storage medium; and perform a physical checksum verification on the block of data based on the checksum data, wherein the physical checksum verification indicates whether the block of data was corrupted subsequent to performing the logical check on the data contained with the block of data.

27. A storage device comprising:

a storage medium; and a storage mechanism communicatively coupled to the storage medium and being configured to generate checksum data by performing a physical checksum calculation on a block of data;

after generating the checksum data, perform a logical check on data contained within the block of data;

if the block of data passes the logical check, then cause the block of data to be written to nonvolatile memory; and write the checksum data to the nonvolatile memory in association with writing the block of data to the nonvolatile memory; and after writing the block of data to the nonvolatile memory, cause the block of data and the checksum data to be read from the nonvolatile memory; and perform a physical checksum verification procedure on the block of data based on the checksum data, wherein the physical checksum verification procedure indicates whether the block of data was corrupted subsequent to performing the logical check on the data contained with the block of data.

28. A method for maintaining data integrity, the method comprising the computer-implemented steps of:

a software application performing a physical checksum calculation on a block of data;

a software application performing a logical check on the block of data;

one or more components other than the software application performing a physical checksum verification on the block of data, wherein the physical checksum verification indicates whether the block of data was corrupted subsequent to performing the physical checksum calculation on the block of data; and if the block of data passes both the logical check and the physical checksum verification, then allowing the block of data to be written to a nonvolatile memory.

29. The method as recited in claim 28, wherein the logical check is performed prior to the performance of the physical checksum verification.

30. The method as recited in claim 28, wherein the logical check is performed after the physical checksum calculation.

31. A computer-readable medium for maintaining data integrity, the computer-readable medium carrying one or more sequences of instructions which, when executed by one or more processors, cause performance of the steps of:

a software application performing a physical checksum calculation on a block of data;

a software application performing a logical check on the block of data;

one or more components other than the software application performing a physical checksum verification on the block of data, wherein the physical checksum verification indicates whether the block of data was corrupted subsequent to performing the physical checksum calculation on the block of data; and if the block of data passes both the logical check and the physical checksum verification, then allowing the block of data to be written to a nonvolatile memory.

32. The computer-readable medium as recited in claim 31, wherein the logical check is performed prior to the performance of the physical checksum verification.

33. The computer-readable medium as recited in claim 31, wherein the logical check is performed after the physical checksum calculation.

34. An apparatus for maintaining data integrity, the apparatus comprising a memory storing instructions which, when executed by one or more processors, cause performance of the steps of:

a software application performing a physical checksum calculation on a block of data;

a software application performing a logical check on the block of data;

one or more components other than the software application performing a physical checksum verification on the block of data, wherein the physical checksum verification indicates whether the block of data was corrupted subsequent to performing the physical checksum calculation on the block of data; and if the block of data passes both the logical check and the physical checksum verification, then allowing the block of data to be written to a nonvolatile memory.

35. The apparatus as recited in claim 34, wherein the logical check is performed prior to the performance of the physical checksum verification.

36. The apparatus as recited in claim 34, wherein the logical check is performed after the physical checksum calculation.

* * * * *